(12) United States Patent
Chauhan et al.

(10) Patent No.: US 12,047,426 B2
(45) Date of Patent: *Jul. 23, 2024

(54) DYNAMIC GROUP SESSION DATA ACCESS PROTOCOLS

(71) Applicant: Bank of America Corporation, Charlotte, NC (US)

(72) Inventors: Sandeep Kumar Chauhan, Telangana (IN); Moses Salagala, Telangana (IN); Swadeep Mekala, Telangana (IN); Amit Kumar Bidhanya, Telangana (IN); Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,742

(22) Filed: Jul. 25, 2023

(65) Prior Publication Data

US 2023/0370503 A1   Nov. 16, 2023

Related U.S. Application Data

(63) Continuation of application No. 17/237,138, filed on Apr. 22, 2021, now Pat. No. 11,750,666.

(51) Int. Cl.
*H04L 12/24*       (2006.01)
*G06N 20/00*       (2019.01)
*H04L 9/40*        (2022.01)
*H04L 41/0803*     (2022.01)
*H04L 65/1069*     (2022.01)
(Continued)

(52) U.S. Cl.
CPC ......... *H04L 65/1076* (2013.01); *G06N 20/00* (2019.01); *H04L 63/101* (2013.01);
(Continued)

(58) Field of Classification Search
CPC . H04L 65/1076; H04L 63/101; H04L 63/102; H04L 65/1069; H04L 65/1086;
(Continued)

(56) References Cited

U.S. PATENT DOCUMENTS 8,209,384 B2   6/2012   Tom et al.
8,276,196 B1   9/2012   Shipley
(Continued)

*Primary Examiner* — Ario Etienne
*Assistant Examiner* — Elizabeth Kassa
(74) *Attorney, Agent, or Firm* — Weiss & Arons LLP

(57) ABSTRACT

Systems, methods and apparatus are provided for a Dynamic Group Session Data Access Protocol. The system may monitor participant input in a group interactive session. The system may be trained to monitor and understand the group environment and predict intent of the participant discussion and may predict relevant data. The system may be used by a single participant or by multiple participants. The system may determine the access level of the participants. The system may determine the access level of the data. The system may compare the access level of the participants with the access level of the data. The system may dynamically mask the data if the access level of the participants does not match the access level of the data. The system may create customized views of the data for each participant based on the participant's access level and the access level of the data.

10 Claims, 3 Drawing Sheets

(51) Int. Cl.
    *H04L 65/1076*     (2022.01)
    *H04L 65/1083*     (2022.01)

(52) U.S. Cl.
    CPC ........ *H04L 63/102* (2013.01); *H04L 65/1069* (2013.01); *H04L 65/1086* (2013.01)

(58) Field of Classification Search
    CPC ............. H04L 65/1093; H04L 65/4015; H04L 63/105; G06N 20/00; G06N 3/0442; G06N 3/09
    USPC ......................................................... 709/204
    See application file for complete search history.

(56) References Cited

U.S. PATENT DOCUMENTS

| | | | |
|---|---|---|---|
| 8,788,653 B2 | 7/2014 | Niemela | |
| 9,953,088 B2 | 4/2018 | Gruber et al. | |
| 10,397,279 B2 | 8/2019 | Foley et al. | |
| 10,701,079 B1* | 6/2020 | Ledet | H04L 63/102 |
| 2009/0106376 A1* | 4/2009 | Tom | H04L 51/04 |
| | | | 709/206 |
| 2009/0252383 A1 | 10/2009 | Adam et al. | |
| 2010/0169313 A1* | 7/2010 | Kenedy | G06F 16/9535 |
| | | | 707/E17.108 |
| 2012/0077536 A1* | 3/2012 | Goel | H04L 12/1822 |
| | | | 455/518 |
| 2013/0151622 A1* | 6/2013 | Goel | H04L 12/1822 |
| | | | 709/205 |
| 2015/0052009 A1 | 2/2015 | Ketchell, III | |
| 2018/0198786 A1 | 7/2018 | Shah et al. | |
| 2019/0114341 A1 | 4/2019 | Schukovets et al. | |
| 2020/0213319 A1* | 7/2020 | Bowie | H04L 63/108 |
| 2020/0403818 A1* | 12/2020 | Daredia | G06N 20/00 |
| 2021/0072880 A1* | 3/2021 | Mathur | G06F 3/0485 |

* cited by examiner

DYNAMIC GROUP SESSION DATA ACCESS PROTOCOLS

FIELD OF TECHNOLOGY

Aspects of the disclosure relate to protocols for locating and rendering data for an interactive group session.

BACKGROUND OF THE DISCLOSURE

Today a great deal of business activity is taking place in an online interaction environment, be it chat, video conference or other online group session environment. It would be helpful for participants to access data relevant to session discussions such as spreadsheets or reports. However, the time required to search the systems for the information may make the need for the information moot. Further a group session may include participants with different levels of access for enterprise files.

It would be desirable to provide an intelligent system to rapidly identify the relevant information while ensuring information security. It would be desirable to monitor the access levels of participants in a group session over time and dynamically render the information based on the access levels of the participants.

SUMMARY OF THE DISCLOSURE

Systems, methods and apparatus may include a system for Dynamic Group Session Data Access Protocols.

The system may capture a participant input from an interactive group session.

The system may determine an access level for each of the participants in the interactive group session.

Using one or more machine learning algorithms, the system may analyze content. The system may analyze context of the participant input. The context may include input from at least one other group session participant. The system may determine a participant intent based on the content and the context of the participant input.

The system may access the database and retrieve enterprise data associated with the participant intent. The enterprise data may be pre-associated with a data access tag.

The system may share the enterprise data with the group session participants. The system may dynamically mask display of the shared data for a group session participant based on the data access tag and the access level of the group session participant.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
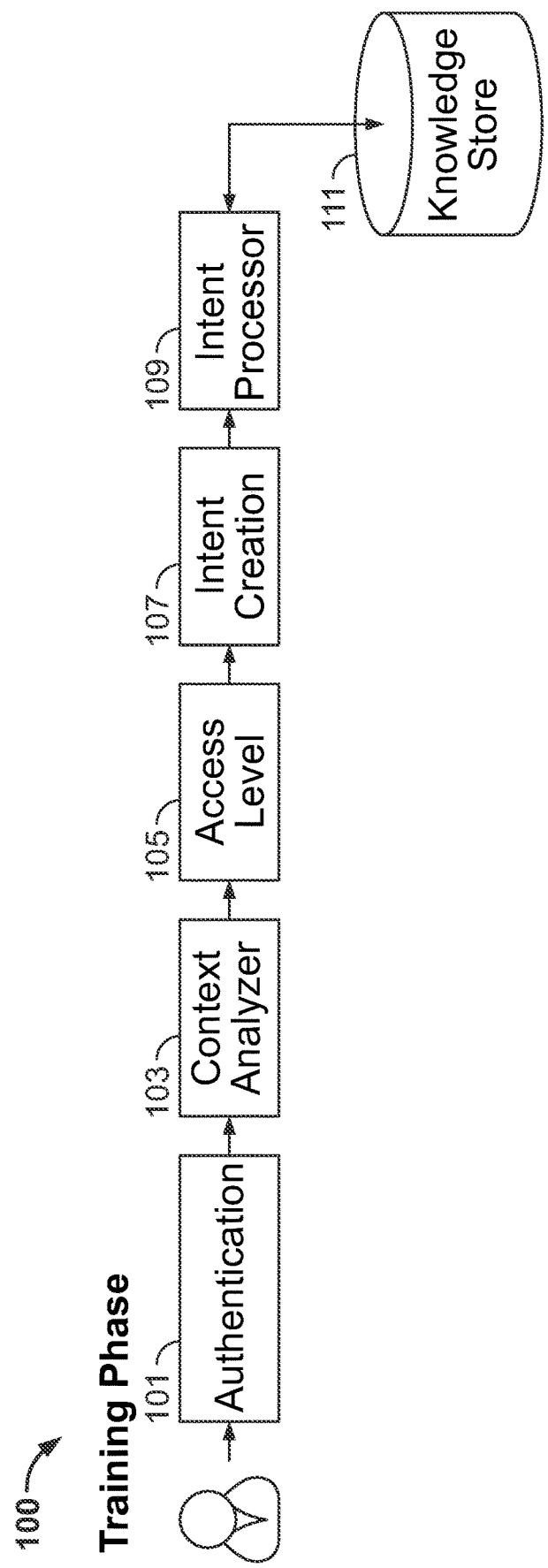
FIG. 1 shows an illustrative process flow in accordance with principles of the disclosure.

Systems, methods and apparatus for Dynamic Group Session Data Access Protocols are provided.

Many business interactions take place during an online interactive group session. An interactive group session may occur via text, images, video, audio, or any other suitable medium. The physical environment of the group session may include a laptop, desktop, mobile device, VPN, organizational network, or any other suitable components.

An interactive group session may include any suitable number of participants. In some embodiments the system may operate with a single participant. The number of participants in an interactive group session may change over time. Participants may leave the interactive group session and participants may be added to the interactive group session.

For the sake of illustration, the invention will be described as being performed by a "system." The system may include one or more features of the apparatus and methods that are described herein and/or any other suitable device or approach.

The system may include one or more databases storing enterprise data.

The system may include a receiver, configured to capture a participant input from an interactive group session.

The system may include a processor configured to monitor online interactions between participants.

The system may be trained to monitor and understand the group environment and predict intent of the participant discussion. The system may predict data relevant to the participant intent. In some embodiments the system may be configured to predict the intent of a single user and provide data to the single user.

The system may use machine learning algorithms to analyze a group session. Machine learning is a subset of artificial intelligence. Machine learning uses algorithms to parse data using a model, learn from the parsed data and make decisions based on what it has learned. Typically, the model used to parse the data is created manually. Many models include man-made feature extraction and engineering modules. The feature extraction and engineering modules identify different core features from training data elements and extract one or more of the identified core features from the training data elements. The extracted features are used to create submodels, each of which corresponds to a different distinct category. The submodels are later used to correctly classify an unclassified data element. During execution, a machine-learning system receives data elements, and determines, based on the model and submodels, which features are included, and, therefore, how to classify each received data element.

Deep learning is a subset of machine-learning. Deep learning classifiers are input labeled training data, otherwise referred to as data that has been classified. Deep learning classifiers learn from the input data and use the learned information to correctly classify unlabeled data during execution. It should be appreciated that substantially no manual feature engineering or manual feature extraction. A deep learning classifier creates, absent human interaction, a non-linear, multi-dimensional classification model based on the labeled-training data.

Deep learning classifiers typically utilize a layered structure of algorithms known as an artificial neural network ("ANN") to create the non-linear, multi-dimensional classification model. An ANN mimics the biological neural network of the human brain. The ANN is comprised of layers of neurons. Each neuron, included in each layer, takes one or more inputs and produces one output. The output is based on the values of the inputs as well as a weight associated with each inputted value. As such, one input can carry more weight than another input. The value that is output from a neuron is then used as the input value for each neuron on a subsequent layer. The values are passed though the multiple layers of the network. The first layer in a network is known as the input layer. The input layer receives input values associated with a data element. During the training of an ANN, the data element also includes a classification. The intermediate layers of the ANN are known as hidden layers. The hidden layers create the robust network of connections between inputs and outputs. The last layer of the network is known as the output layer, and usually outputs a classification. During execution, the output layer outputs a classification for a heretofore-unclassified inputted data element.

Many ANNs are feed-forward artificial neural networks, in which the output from a neuron on a first layer is only input to a neuron on a second layer. Feed-forward neural networks are different from recurrent neural networks, in which outputs may be used as inputs for the same layer or a previous layer. A neural network that includes more than two layers is considered to be using a deep learning algorithm. An ANN comprises three or more layers. Each layer of neurons in an ANN builds upon the previous layers. The connections between the neurons on the multiple layers enable the deep learning system to accurately identify and classify previously unclassified data elements.

The system may train a Long Short-Term Memory (LSTM) Neural Network to monitor and analyze the group environment, predict intent of the participant discussion, and identify relevant data. LSTM networks are a modified version of recurrent neural networks with improved memory access. LSTM is well-suited to classify, process and predict time series given time lags of unknown duration. LSTM Networks may process single data points (such as images), as well as entire sequences of data (such as speech or video).

The system may include a training phase. The training phase may include input parameters comprising a group session interaction. The interaction may be a simulated interaction generated by the system. The interaction may be an actual group session either recorded or live. The training phase may include obtaining output comprising a determination of intent. The training phase may include obtaining output comprising a mapping of the intent to enterprise data. The training phase may include storing the participant input from a group session, a correct determination of intent for the input from a group session, and a correct mapping of the intent to the relevant data in a knowledge store.

The system may be trained to connect word or phrases extracted from participant input with relevant data. The system may be trained to identify the intent of a participant and the tone of a group session. In some embodiments that system may use the content of participant input to expect certain queries for information. In some embodiments the system may use the content of the participant input to use keywords or other natural language processing to locate and retrieve data from the one or more databases storing enterprise data. The system may match participant input with a general conversations table. The system may match participant input with a table names database. The system may match participant input with a profile table. The system may run date range queries. The system may match participant names with a hierarchy table.

The training phase may include a context analyzer. The context analyzer may track the participant input, the theme of the participant input, and the physical environment of the conversation.

The output from the context analyzer may be a prediction of the intent of a participant in the interactive group session.

The system may predict documents and data that may be requested by the participants in the group session. For example, the input from one participant in a group session may mention expenses. Based on the input the context analyzer may predict that the intent of the participants is to view expense reports. Based on this intent the system may retrieve data relevant to expense reports. The system may use the determined intent to retrieve data that may be asked for in future group session discussions.

The system may be trained to render the retrieved data based on the access level of each participant. Each participant may have a different level of access to documents and data. The access level may include read only access. The access level may include read/write access. The access level may depend on the security access of the participant. The access level may depend on hierarchy within the enterprise. The highest person in the hierarchy may have more access then someone on a lower level. Some participants in the interactive group session may have no access at all.

The data retrieved by the system may have metadata tags associated with access levels. The data may be classified by level of access. The system may compare the level of access of the data with the level of access of the participants.

Following the training period, the system may move to an execution phase. In the execution phase, the system may initially authenticate the participants in the groups session to ensure that the participants are authorized to use the system. The authentication process may be based on a user identification and password. The authentication may be based on any suitable validation protocols.

During the execution phase, the system may monitor the interactive group session discussion. The system, as it was trained, may use one or more machine learning algorithms to analyze content of the participant input, the content may include language extracted from the participant input. The system may analyze context of the participant input, the context may include input from at least one other group session participant. The execution phase may use the context analyzer as used in the training phase to determine a participant intent, the determination based on the content and the context of the participant input.

In some embodiments, the context may include an emotion associated with a participant input. The input may be a graphic image. The emotion may be derived from the graphic image. For example, the graphic may be a smiley face indicating happiness with the retrieved data. Another example may be a graphic to show urgency that may lead to prioritizing a data query.

The system may search the databases storing enterprise data to retrieve data based on the intent determined by the context analyzer and the information learned during the training phase.

The execution phase may involve analyzing the access level of each participant in the interactive group session. The system may identify classification of the documents based on the meta data tags associated with the documents to determine the access level of the documents and data retrieved. The system may compare the access level of the documents with the access level of the participants in the group session.

The system may intelligently customize displays for each group session participant based on access level. The system may dynamically mask retrieved document content for individual participants based on access level. The system may encrypt shared files in a session window in real time.

The system may monitor identities and access levels of participants in the interactive group session over time. The system may identify an access level for a participant joining the group session. Based on the access level, the system may dynamically mask display of a group session history for the participant joining the group session.

In some embodiments, the system may limit shared data based on the lowest participant access level among the participants in the group session.

In some embodiments, the system may selectively route enterprise data files associated with the participant intent to participants in the interactive group session based on the access level of each participant. The data files may be encrypted for additional security.

The system may continue to learn and improve through the execution phase. The system may include a Feedback Processor. The Feedback Processor may track whether the intent predicted by the system was correct. The Feedback Processor may track whether the system made the correct connection between the content or intent of the session and the data retrieved in response.

The system may be trained to interpret communications between participants. The system may intervene when a first participant attempts to directly communicate information to a second participant having a different level of access. The system may intervene when a first participant attempts to share a document with a second participant having a different level of access. The system may mask communications to participants without the corresponding level of access.

The system may include various hardware components. Such components may include a battery, a speaker, and antenna(s). The system may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. Software may provide instructions, that when executed by the microprocessor, enable the system to perform various functions. For example, software may include an operating system, application programs, web browser and a database.

Application programs, which may be used by the system, may include computer-executable instructions for invoking user functionality related to communication, authentication services, and voice input and speech recognition applications. Application programs may utilize one or more algorithms that encrypt information, process received executable instructions, interact with enterprise systems, perform power management routines or other suitable tasks.

The system may operate in a networked environment. The system may support establishing communication channels with one or more enterprise systems. The system may connect to a local area network ("LAN"), a wide area network ("WAN") a cellular network or any suitable communication network. When used in a LAN networking environment, the system may be connected to the LAN through a network interface or adapter. When used in a WAN networking environment, the system may include a modem or other means for establishing communications over a WAN, such as the Internet. It will be appreciated that the existence of any of various well-known protocols such as TCP/IP, Ethernet, FTP, HTTP and the like is presumed.

The system may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The system may utilize computer-executable instructions, such as program modules, being executed by a computer. Generally, program modules include routines, programs, objects, components, data structures, etc. that perform particular tasks or implement particular abstract data types. The system may be operational with distributed computing environments where tasks are performed by remote processing devices that are linked through a communications network. In a distributed computing environment, program modules may be located in both local and remote computer storage media including memory storage devices.

Systems, apparatus and methods described herein are illustrative. Systems, apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Systems and apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative process flow 100 for a training phase for a machine learning algorithm for dynamic group session access restrictions. At step 101 the participant is authenticated to ensure proper authorization to use the system.

At step 103 the content and context of input from a group session participant is analyzed using machine learning algorithms. The input may be taken from a group session discussion being analyzed. The group session discussion may be live or may be simulated. The system may extract terms or phrases from the content and context of the group session. The system may predict intent from the content and context of the participant input.

At step 105 the access level of the participants in the group session is determined.

At step 107 the intent of the participants is determined based on the content and the context of the input.

At step 109 the intent is mapped to enterprise data.

At step 111 the group session input, a determination of intent for the input, and a mapping of the intent in may be stored in a knowledge store database.

Figure 2:
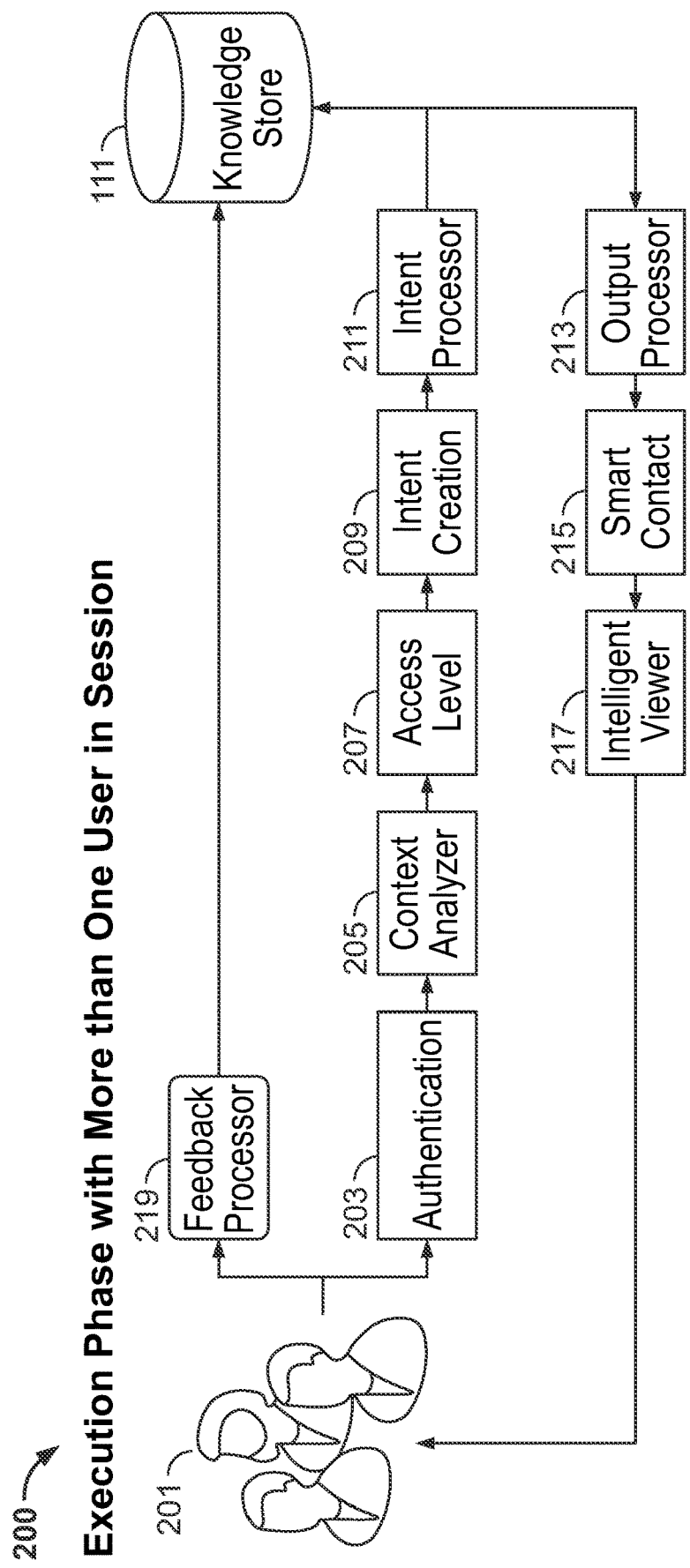
FIG. 2 shows an illustrative process flow in accordance with principles of the disclosure.

FIG. 2. shows illustrative process flow 200 for an execution phase locating and rendering data for dynamic group session data access protocols.

At step 203 the participants in the group session are authenticated to ensure that they are authorized to use the system. 201 shows a number of group session participants At step 205 the content and context of the input of is determined. The system may analyze content of the participant input. The content may include language extracted from the participant input. The system may analyze context of the participant input, the context may include input from at least one other group session participant.

At step 207 the access level of the participants is determined.

At step 209 the intent of the participant is determined based on the content and context of the participant input.

At step 211 the Intent Processor maps the intent of the participant to relevant enterprise data and retrieves the data.

At step 213 the Output Processor compares the access level of the data to the access level of the participants. The Output Processor mask the data so those without the level of access cannot view the data. In some embodiments the Output Processor may ask the participants for an alternate delivery method such as email and may route the data to the selected participants with the level of access.

At step 215, the system uses smart contacts to monitor the access level of the participants. The smart contacts connects with an active directory of participants and determines contact information and access level. The system may recognize when participants leave or join the group session and maintain a dynamic awareness of the lowest level of authorization or access within the group.

At step 217, the system may use an Intelligent Viewer to monitor the access levels for participants in a group session. The Intelligent Viewer may restrict presentation of retrieved documents based on the lowest level of authorization or access within the group. The system may dynamically mask display of a group session history for the participant joining the group session.

At step 219 feedback associated with the shared data from a group session participant is received. The machine learning algorithm is configured to modify subsequent determinations of intent based on the feedback. The feedback may be derived from a graphic image. The feedback may be a participant acknowledging the correct data was retrieved or that the data retrieved did not match the intent.

At step 221, the feedback received, the determination of intent, and the mapping of the intent to the data is stored in a knowledge store database.

Figure 3:
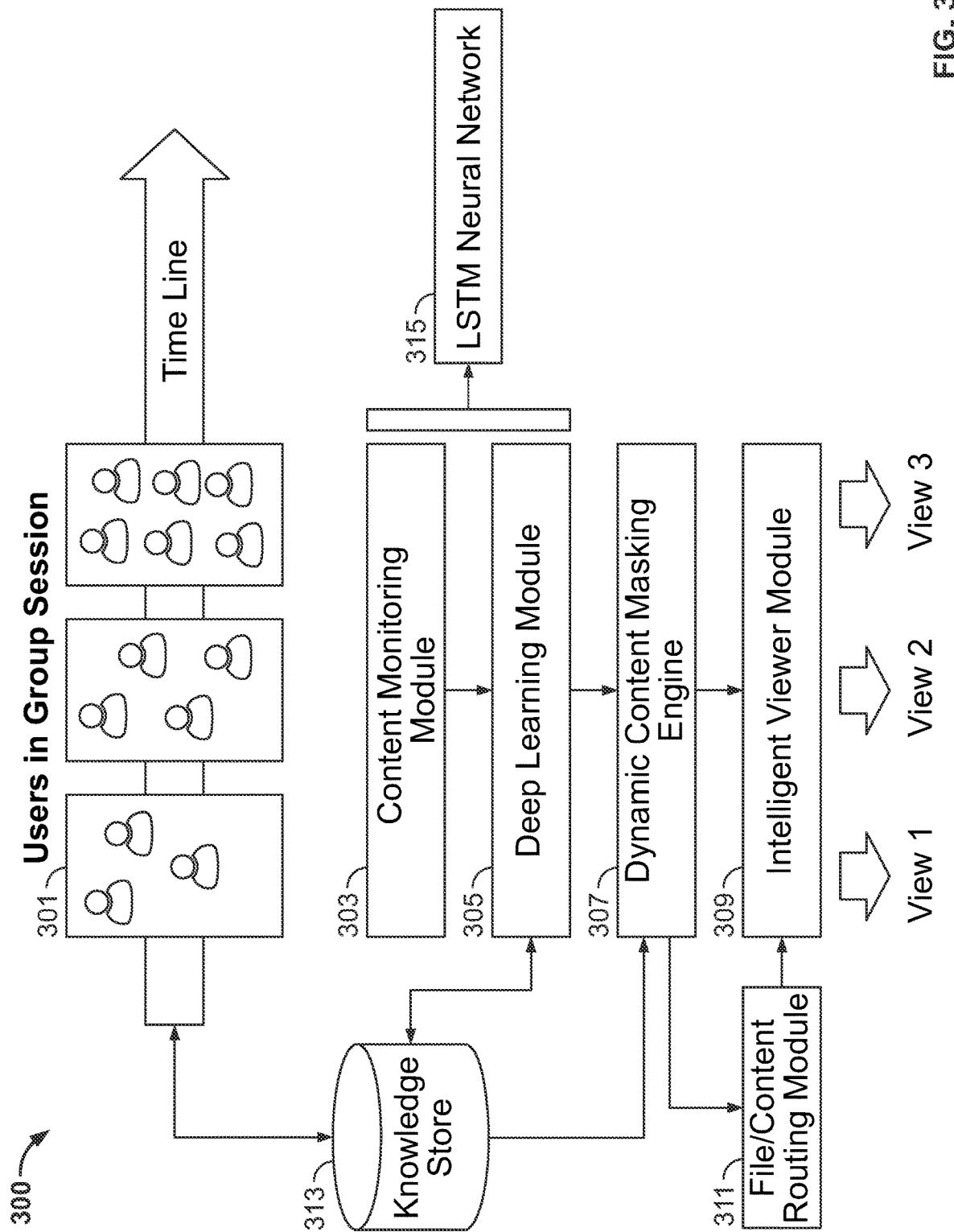
FIG. 3 shows a illustrative architecture in accordance with the principles of the disclosure.

FIG. 3 shows illustrative architecture of dynamic masking in a group session. Group 301 shows the participants in a group session. The composition of the group may change over time as new participants join the session or participants leave the session.

Content Monitoring Module 303 monitors the input from the participants in the group session and analyzes the input using an LSTM Neural Network. Based on the content and context of the input the system uses 305 deep learning methods to determine intent of the participants, maps the intent to enterprise data, and retrieves the data.

Dynamic Content Masking Engine 307 compares the access level of the participants to the access level of the data. Dynamic Content Masking Engine 307 may monitor the access levels for participants in a group session. The system may recognize when participants leave or join the group session and maintain a dynamic awareness of the lowest level of authorization or access within the group. The Dynamic Content Masking Engine may restrict presentation of retrieved data based on the lowest level of access within the group.

Intelligent Viewer Module 309 prepares individually customized views of the data for each participant in the group session based on the individual's access level. The Intelligent Viewer may encrypt the shared data.

File Content Routing Module 311 may selectively route enterprise data files associated with the participant intent to participants in the interactive group session based on the access level of each participant. The data files may be encrypted for additional security.

Knowledge Store database 313 may store the content, content and intent determined by the 303 Chat Content Monitoring Module and 305 Deep Learning Module.

Thus, systems, methods, and apparatus for a Dynamic Group Session Access Restrictions are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for providing dynamic group session data access protocols, the system comprising:
   one or more databases storing enterprise data;
   a receiver configured to capture a participant input from each participant in an interactive group session; and
   a processor configured to:
     determine an access level for each of the participants in the interactive group session;
     using one or more machine learning algorithms:
       analyze content of the participant input, the content comprising language extracted from the participant input;
       analyze context of the participant input, the context comprising input from at least one other group session participant; and
       determine a participant intent, the determination based on the content and the context of the participant input;
       access the database and retrieve enterprise data associated with the participant intent, the enterprise data pre-associated with a data access tag;
       share the enterprise data with the group session participants;
       match the participant input with an entry in a general conversations table;
       match the participant input with an entry in a table names database;
       match the participant input with an entry a participant profile table;
       determine a physical environment of the interactive group session;
       dynamically mask display of the shared data for a group session participant based on the data access tag and the access level of the group session participant, and
       monitor a plurality of identities corresponding to the participants, the entry in the general conversations table, the entry in the table names database, the entry in the participant profile table, and the physical environment of the conversation interactive group session and the access levels of participants in the interactive group session over time.

2. The system of claim 1, wherein the receiver is further configured to receive feedback associated with the shared data from a group session participant and the machine learning algorithm is configured to modify a subsequent determination of intent based on the feedback.

3. The system of claim 2, wherein the feedback is derived from a graphic image.

4. The system of claim 1, wherein the context further comprises an emotion associated with a participant input.

5. The system of claim 4, wherein the input is a graphic image and the emotion is derived from the graphic image.

6. The system of claim 1, wherein the processor is configured for a semi-supervised machine learning algorithm training phase, the training comprising:
   generating input parameters comprising a group session interaction scenario;
   obtaining output comprising a determination of intent based on the scenario;
   obtaining output comprising a mapping of the intent to enterprise data; and
   storing a scenario, a correct determination of intent for the scenario, and a correct mapping of the intent in a knowledge store.

7. The system of claim 1, wherein the processor is further configured to monitor identities and access levels of participants in the interactive group session over time.

8. The system of claim 7, wherein the processor is further configured to:
   identify an access level for a participant joining the group session; and
   based on the access level, dynamically mask display of a group session history for the participant joining the group session.

9. The system of claim 1, wherein the processor is further configured to limit shared data based on the lowest participant access level among the participants in the group session.

10. The system of claim 1, wherein the processor is further configured to selectively route enterprise data files associated with the participant intent to participants in the interactive group session based on the access level of each participant.

* * * * *